D. A. Webster,
Tapping Pipes,
N°. 9,085.   Patented June 29, 1852.
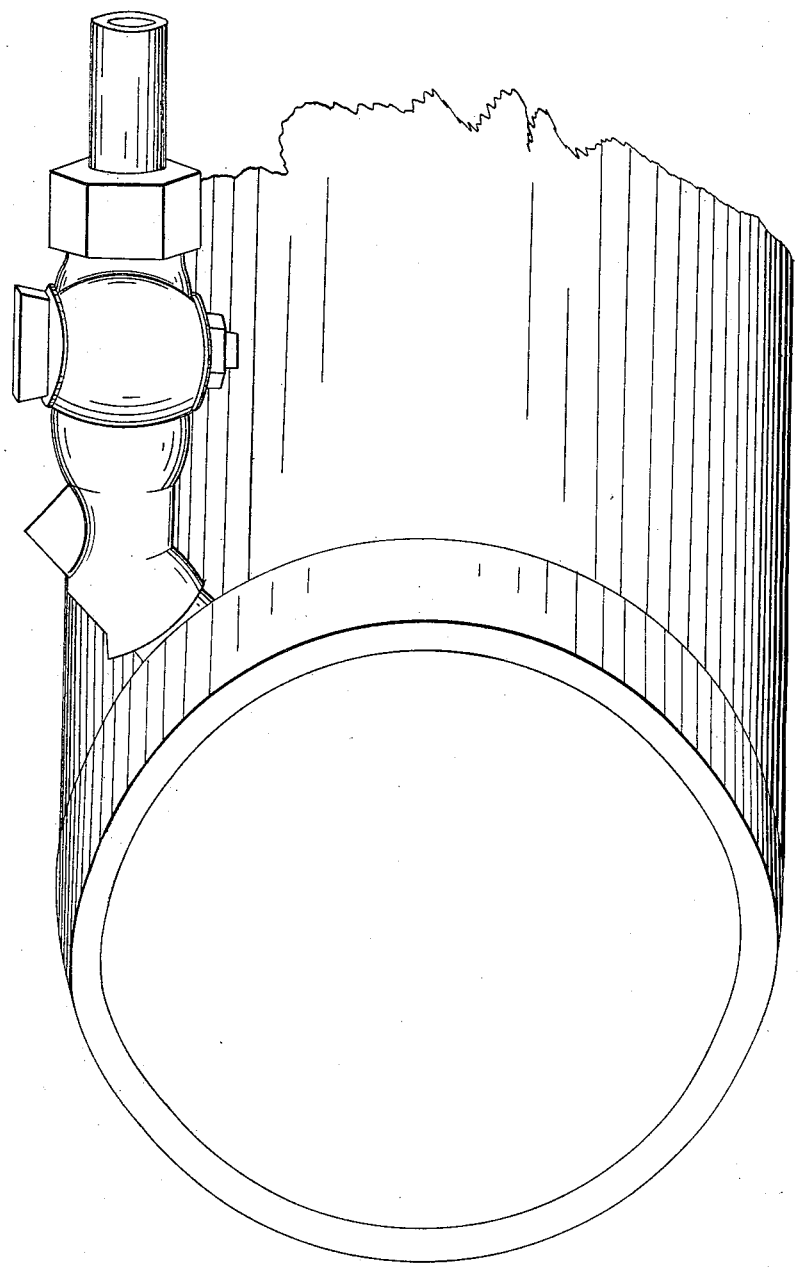

UNITED STATES PATENT OFFICE.

DANL. A. WEBSTER, OF NEW YORK, N. Y.

IMPROVEMENT IN CONNECTING COCKS WITH PIPES.

Specification forming part of Letters Patent No. 9,085, dated June 29, 1852; antedated December 29, 1851.

*To all whom it may concern:*

Be it known that I, DANIEL A. WEBSTER, of the city, county, and State of New York, have invented certain new and useful Improvements in the Method of Tapping Water, Gas, and other Pipes; and I do hereby declare the following to be a full, clear, and exact description of the same, reference being had to the accompanying drawings, in which—

Figure 1 represents the connection as made between the street or main and the lateral pipe. Fig. 2 represents the stop-cock as constructed previous to its attachment to the street-pipe; and Fig. 3 represents an enlarged view of Fig. 2, for the purpose of more fully showing the nature of the invention.

Similar letters refer to like parts in the several figures.

The nature of my invention consists in making a tight joint between the main and connecting or lateral pipe, by boring the hole in the main pipe as nearly cylindrical as may be, and making that part of the cock which is to be inserted near the end and near the shoulder of equal diameter with said hole, and the central part, or that part between the end and shoulder, slightly larger; and then driving the cock into its place, the edges of the hole shaving the cock to its proper size and form.

The difficulty heretofore existing in making a tight joint between the main and lateral pipes arises from the fact that it has been found almost impossible to drill or make a perfectly round hole in the main pipe. The least inequality in the texture of the metal, either in being harder or softer in certain spots, throws the drill or other tool to one side or the other; or, as sometimes happens, the drill itself may be slightly cut away by the hard metal in the pipe, and consequently makes an irregular-shaped hole. If the end of the stop-cock is turned to the size of the drill which bores the hole, it will not make a tight joint. A conical or tapering hole and end is equally objectionable, as they are so easily forced out, beside so much of the metal is cut away as to very much weaken it. To remedy these defects, I bore the hole in the main pipe as nearly round as can be done by ordinary means, and which hole may be drilled on the side of the pipe instead of on the top, as is usually done. The end of the stop-cock is cast or formed in a curved line instead of a right angle, as would be the case if the hole were bored in the top of the pipe, and which curved shape allows the water or any casual obstruction to pass more freely. The end of the stop-cock which is to be inserted in the street-pipe is then turned or finished off of equal size and diameter at or near the point and shoulder thereof, and is swelled out between these points, as seen at A B C D, Figs. 2 and 3, so as to make that part of it barrel-shaped and slightly larger than the end or point and shoulder. The end of the cock thus shaped is driven into the hole, the edges of the hole cutting or shaving off the excess of metal on the bulge of the cock and leaving other portions of the metal to fill up the irregularities of the hole, and leaving the stop-cock in close contact with every part of the hole, and making a perfectly tight joint. By this means I retain all the strength of the cock and make a more perfect and durable joint than has heretofore been done.

Having thus fully described my invention, what I claim therein as new, and desire to secure by Letters Patent, is—

The manner herein described of making a tight joint, viz: by boring the hole in the pipe as nearly cylindrical as may be, and making that part of the cock which is to be inserted near the end and near the shoulder of equal diameter with the holes, and the central part slightly larger, and then driving the cock into its place, the edges of the hole shaving the cock to its proper size and form.

DANIEL A. WEBSTER.

Witnesses:
WILSON AGER,
A. B. STOUGHTON.